United States Patent
White

[15] 3,659,536
[45] May 2, 1972

[54] ROOT FEEDER DEVICE

[72] Inventor: Robert B. White, 13 County Club Drive, Larchmont, N.Y. 11538

[22] Filed: Oct. 1, 1970

[21] Appl. No.: 77,144

[52] U.S. Cl. ................................. 111/7.1, 175/21
[51] Int. Cl. ................................................ A01c 23/02
[58] Field of Search .......................... 111/7.1–7.4; 239/271; 175/21; 61/13

[56] References Cited

UNITED STATES PATENTS

| | | | |
|---|---|---|---|
| 1,688,356 | 10/1928 | Romney | 175/21 X |
| 1,756,582 | 4/1930 | Butler | 239/271 |
| 1,893,707 | 1/1933 | Karshner | 111/7.1 |
| 1,964,064 | 6/1934 | Karshner | 111/7.1 |
| 3,397,541 | 8/1968 | Kersh | 239/271 X |

FOREIGN PATENTS OR APPLICATIONS 465,713   9/1928   Germany ............................. 111/7.2

*Primary Examiner*—Robert E. Bagwill
*Attorney*—Lilling & Siegel

[57] ABSTRACT

A root feeding device is disclosed, the device comprising a hollow pipe adapted to be connected to a liquid source and having a generally pointed central rod suspended past the lower end thereof. A valve core is slidably disposed in the pipe concentrically about the central rod, the valve core extending beyond the pipe and defining a leading tip therefor. The central rod and the valve core provide axial fluid flow when the valve core is retracted into the pipe, thus aiding immersion of the pipe into the ground. When the pipe is immersed, the valve core is partially slidably retracted therefrom to thus provide radial fluid flow. Importantly, the construction is such as to obviate clogging of the apparatus by soil, pebbles and the like.

6 Claims, 10 Drawing Figures

Patented May 2, 1972

INVENTOR.
ROBERT B. WHITE
BY
Lilling and Siegel
ATTORNEYS

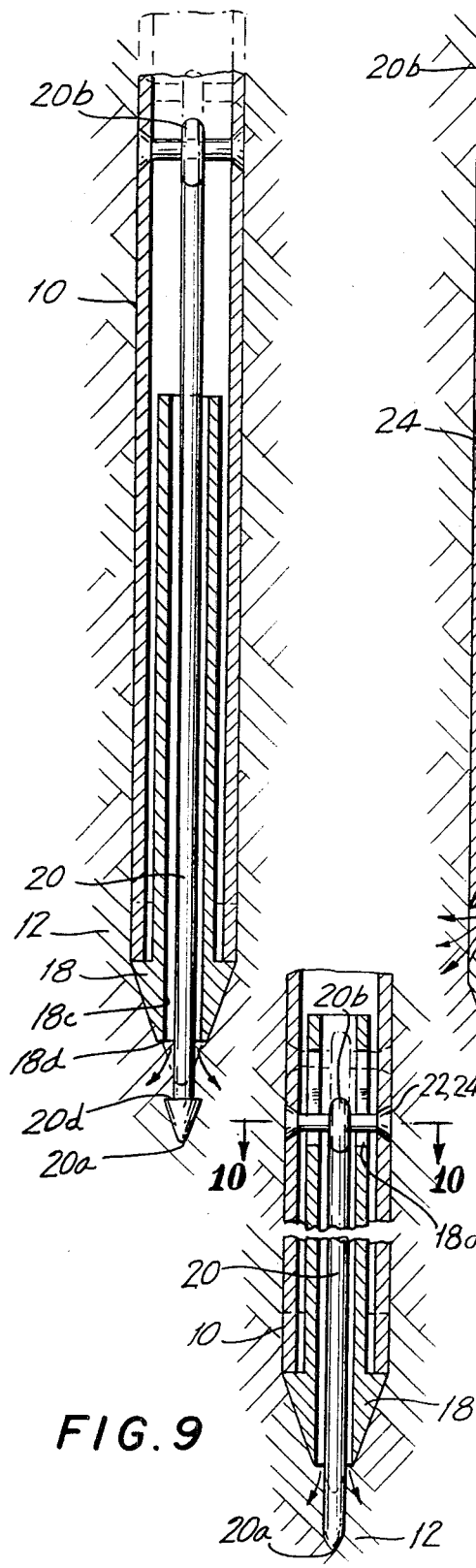
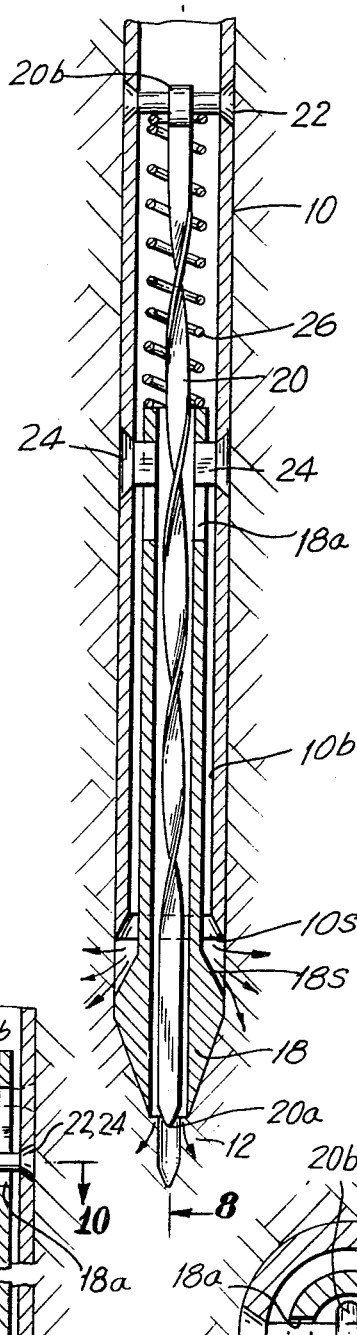
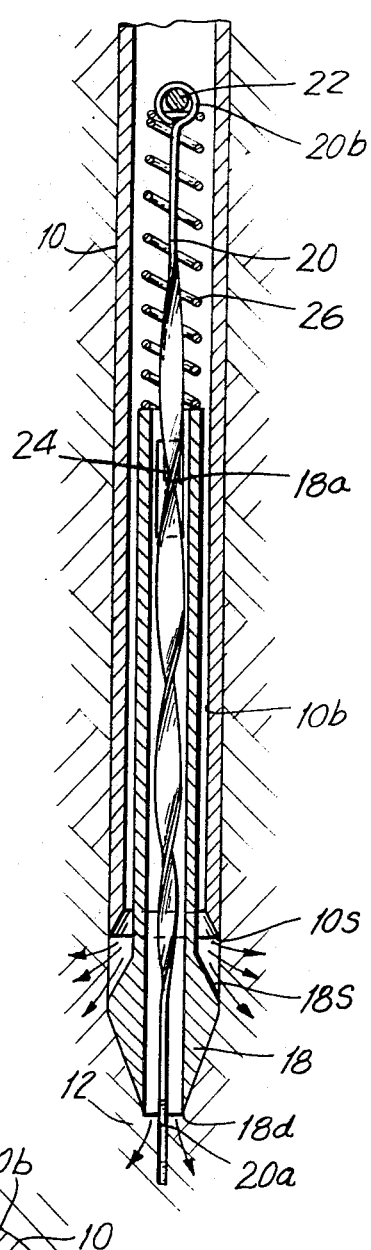
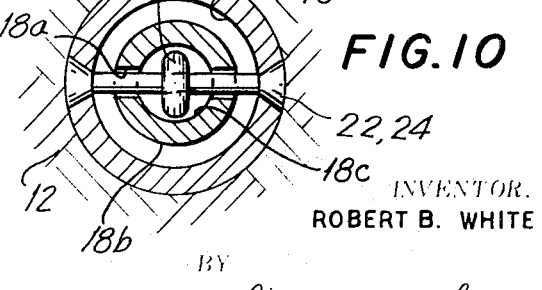
INVENTOR.
ROBERT B. WHITE
BY
Lilling and Siegel
ATTORNEYS 3,659,536

ROOT FEEDER DEVICE

BACKGROUND OF THE INVENTION

The invention generally relates to root feeding devices, and is particularly concerned with an improved device for directing water or fluid fertilizer at available pressures into horizontal fluid flow beneath the surface of the ground to thus feed the roots of a plant or other organism.

A great deal of waste of water and fertilizer is associated with surface application and such waste may be obviated by directly supplying these fluids to the sub-strata plant and tree root systems. Specifically, unwanted fluid drainage from sloped ground and fluid loss due to evaporation are completely avoided. Direct root feeding also overcomes the inefficiency inherent in attempting to reach root systems in very hard ground by surface irrigation.

While numerous prior art root feeding devices exist of the general type herein contemplated, their use has not proved entirely satisfactory. The typical prior art root feeders will be seen to contain a complicated valve and point mechanism at the end of an elongated root feeder pipe, which mechanism effects both lateral and axial flow of fluid. The axial fluid flow serves to erode the ground below the point of the mechanism in order to minimize the force required to insert the pipe, thus effectively creating a hydraulic drill. This feature in general, does tend to obviate the need for heavy equipment which was once required to insert the pipe into the ground and makes insertion possible with downward force applied manually and with hammer blows. The difficulty with these existing valve mechanisms concerns the fact that the mechanisms often become clogged with pebbles and debris during insertion and available water pressure coupled to the pipe is insufficient to dislodge the clogging particles.

The axial fluid flow and its benefits are thus lost, and if the forces required for insertion then become too great, the pipe must then be pulled up and cleaned.

In much the same manner as above discussed, often the passageway in the valve mechanism of prior art devices which provides the lateral fluid flow also becomes clogged, thus rendering the device unusable.

SUMMARY OF THE INVENTION

There thus remains a need in the art for a root feeder valve mechanism which will provide axial flow of fluid during insertion and lateral flow of fluid while irrigating and which will not become clogged with debris. The primary object of the present invention is to provide a device which will satisfy this need.

More specifically, but still in a broad sense, it is an object of the instant invention to provide a mechanism for mechanically clearing the axial fluid flow passageway during insertion into the ground of the root feeder pipe.

It is an additive object of the present invention to achieve as much isolation as possible between the axial fluid flow passageway and the lateral fluid flow passageway to minimize the collection of debris in the latter during insertion of the root feeder.

A further important object of the instant invention is to accomplish the above objects with as simple and as inexpensive a construction as possible.

Yet another object of this invention is to provide substantially automatic operation of the various features of the device.

These objects as well as others which will become apparent are implemented by the root feeder of the present invention which comprises an elongated pipe adapted to be driven into the ground, the pipe having fluid inlet means at its top end for receiving fluid under pressure and valve and point means at its bottom end. The valve and point means comprise essentially a three piece structure comprising the pipe, a slidable generally tubular valve core within and extending below the pipe, and a central guide rod which has a generally pointed tip and which passes through the slidable valve core. The passageway for axial fluid flow is the radial space between the slidable valve core and the central guide rod. The passageway for radial fluid comprising the radial clearance between the slidable valve core and the pipe is uncovered during insertion of the root feeder when the pipe is pulled up slightly. This action, in addition to allowing radial fluid flow also causes the inside of the slidable valve core to strip debris off the center guide rod thereby clearing the axial fluid passageway. This technique of momentarily stopping insertion of the root feeder pipe and instead actuating the stripping of the central guide pin is preferably done by an occassional pulling up and down of the pipe in the vertical direction.

BRIEF DESCRIPTION OF THE DRAWINGS

The invention will be better understood, and objects other than those set forth above will become apparent, after reading the following detailed description. Such description makes reference to the annexed drawings presenting preferred and alternative embodiments of the invention, wherein:

FIG. 6 is a side-elevation cross-sectional view of the valve portion of an alternate embodiment wherein the drilling and irrigating conditions are superimposed as shown in dotted lines.

FIG. 7 is a view similar to that of FIG. 6 of yet another alternate embodiment.

FIG. 8 is a side-elevation cross-sectional view taken through the lines 8—8 of FIG. 7.

FIG. 9 is a partially fore-shortened side-elevation cross-sectional view of still another alternate embodiment with the drilling and irrigation conditions superimposed and shown in dotted lines; and FIG. 10 is a plan cross-sectional view taken through the lines 10—10 of FIG. 9.

DETAILED DESCRIPTION OF PREFERRED EMBODIMENTS

Figure 1:
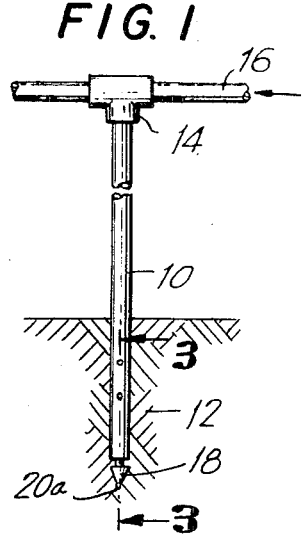
FIG. 1 is a side-elevation view of the novel root feeder installation showing water or other fluid being supplied to a partially fore-shortened sub-strata root feeder pipe, the bottom end of which being depicted in the irrigating condition.

Referring initially to FIG. 1, there is depicted therein a root feeder installation comprising a substantially vertical pipe 10, the bottom portion of which is below the surface of the ground 12. While the fluid inlet means there shown is a tee tap 14 from a horizontal run of pipe 16, it is to be understood that the provision of any fluid input means, for example a fitting which will cooperate with a conventional garden hose or any other source of hydraulic fluid under pressure, is appropriate to the invention. The bottom of the substantially vertical pipe retains a slidable valve core 18 and a generally pointed central guide rod 20a.

Referring next to FIGS. 2 through 5, it can be seen that the bottom portion of the pipe 10 preferably comprises a central guide rod 20 which is generally pointed at its bottom 20a and is retained by a crosswise pin or rivet 22 passing through a crosswise opening 20b in the central guide rod 20, the crosswise opening being depicted as an eyelet. The central guide rod 20 is preferably of hardened steel construction.

The valve core 18 contains a longitudinal slot 18a which in cooperation with pins or screws 24, provide retracted position (shown in FIG. 2) and an extended position (shown in FIGS. 3 and 4) for the valve core 18. In the retracted or hydraulic drilling position, the only fluid flow passes in the radial space between the central guide rod 20 and the bore of the slidable valve core 18c. This radial space or clearance is preferably a sliding fit.

Figure 2:
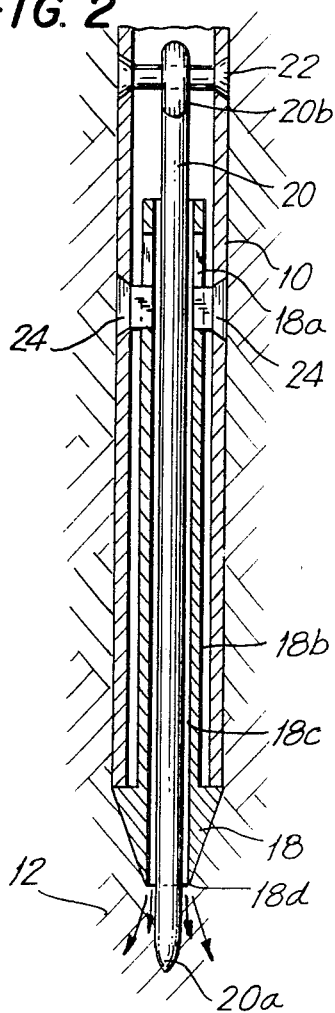
FIG. 2 is a side-elevation, cross-sectional view of the valve portion of the root feeder taken through the lines 3—3 of FIG. 1, wherein the valve core is shown in the hydraulic drilling condition.
Figure 3:
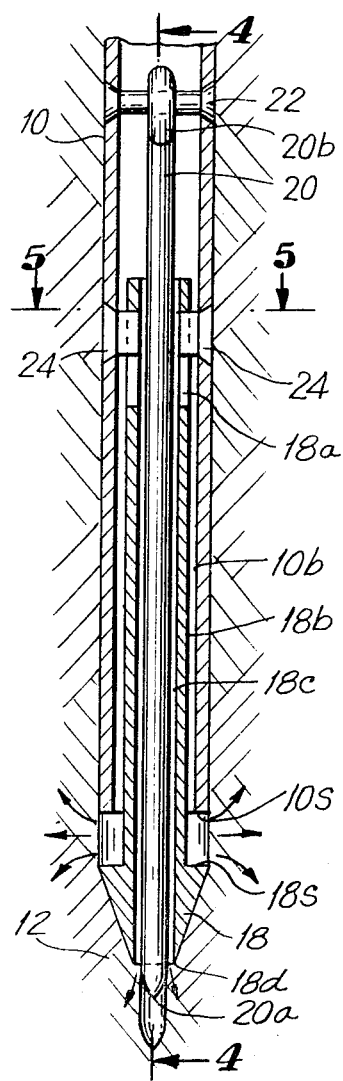
FIG. 3 is a view similar to that of FIG. 2 except that the valve core is depicted in the irrigating condition.
Figure 4:
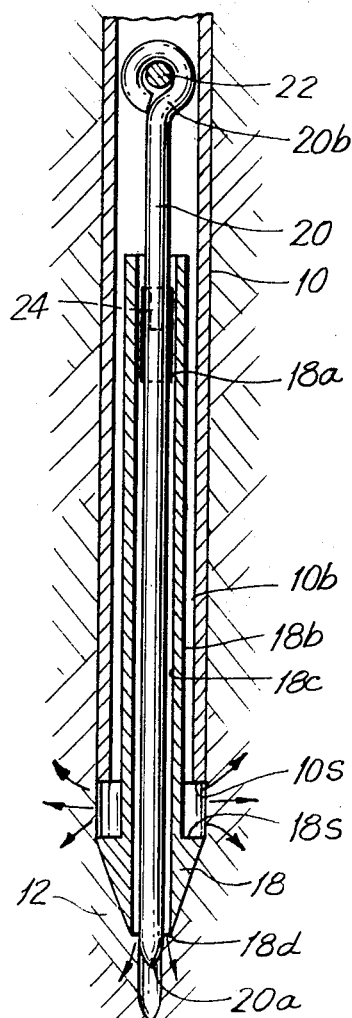
FIG. 4 is a side-elevation, cross-sectional view of the valve portion of the root feeder taken through the lines 4—4 of FIG. 3, the valve core again being shown in the irrigating condition.
Figure 5:
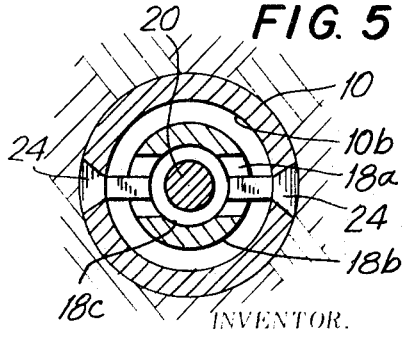
FIG. 5 is a plan, cross-sectional view taken through the lines 5—5 of FIG. 3.

The fluid passing over the central guide rod exists in an axial jet, illustrated in FIG. 2, which erodes the ground below the point 20a and in effect acts as a hydraulic drill, markedly reducing the force required to insert the root feeder pipe 10 into the ground 12. Fluid flow from the radial space between the outer diameter 18b of the valve core 18 and the inner diameter 10b of the pipe 10 is cut off in the hydraulic drilling condition by the abutment of complementary surfaces 10s and 18s of these two parts. The upwardly vertical force acting on the valve core 18 during insertion of the root feeder pipe maintains the abutment of said complementary surfaces thereby keeping the device in the hydraulic drilling condition.

However, when the root pipe 10, after insertion into the ground, is pulled upward slightly, the valve core 18 stays wedged into the ground 12 until pins or screws 24 encounter the upper end of the axial slot 18a in the valve core. This action places the device in its irrigating condition. Fluid will now flow over the outer diameter 18b of the valve core 18 and out of the device between the now separated complementary surface 10s and 18s producing a generally radially directed outward flow from the pipe (illustrated in FIGS. 3 and 4). Due to the creation of an easier path of fluid flow, the axial fluid flow over the central guide rod will be reduced to a mere trickle. Since an upward pull on the pipe 10 pulls the central guide rod 20 upwardly, via force transmitted by the crosswise pin or rivet 22, while the valve core 18 tends to stay wedged in the ground 18, debris is stripped off the central guide rod by the bottom of the slidable valve core 18d. Thus an upward pull or vertical shaking on occasion during feeder pipe insertion will clear the hydraulic drilling passageway.

As depicted in FIG. 6 a variety of shapes may be used for the end of the central guide rod 20a. Such end may be pointed, rounded, or flattened. In fact, it is possible to incorporate a small flat 20d above the generally pointed end 20a of the central guide rod 20 which provides a diameter which is larger than the bore of the slidable valve core 18c. This flat will abut against the bottom of the valve core 18d when the device is put in the irrigating condition, thus substantially cutting off axial flow of water during root feeding.

Reference will next be made to FIGS. 6 and 7 wherein several alternative features are illustrated. The provision of fluid pressure does tend to push the slidable valve core 18 downward relative to the pipe 10 and may, in soft ground, be sufficient to automatically place the device in the irrigating or root feeding condition when insertion force is removed from the root feeder pipe. Yet, a spring 26 may be placed in such a manner as to cause the device to be placed in the irrigating condition. The spring 26 applies pressure which tends to separate the slidable valve core 18 and the root feeder pipe 10 through force transmitted via the pin or rivet 22. This spring pressure or force is less than the minimum force required for insertion of the root feeder pipe and is thus overcome when insertion force is applied but automatically causes the device to be placed in the irrigating condition when the insertion force is removed. Thus, with such an arrangement, debris can be stripped from the central guide rod and the hydraulic drill fluid passages may be cleared by discontinuing downward pushing on the root feeder pipe.

When the central guide rod 20 is made of a helical or twisted shape, a very valuable result will be seen to occur. The axial flow of fluid for hydraulic drilling exits the root feeder with a longitudinal spin axis or with a swirl. The swirling fluid creates a very efficient hydraulic drilling action. The complementary surfaces of the pipe and valve core 10s and 18s, respectively, which provide a seal during hydraulic drilling may be plane surfaces, or as illustrated, may be conical surfaces depending on the desired lateral fluid flow pattern.

As shown in FIGS. 9 and 10, one pin, rod, or screw can be used to retain the central guide rod 20 and the slidable valve core 18. The pin, rod or screw, or generically, pin means, 22, 24 can, looking radially inward, pass crosswise first through the root feeder pipe 10, then through the axial slot 18a in the slidable valve core 18, and then through the crosswise hole or eyelet 20b in the central guide rod 20. Furthermore, if more than one pin means 22, 24 is used as previously illustrated they may be parallel or make an angle with each other in the azimuthal direction. For example, they may pierce the circular periphery of the pipe 10 90° apart. In fact, the two pin means may be used at vertical levels where they each encounter the slidable valve core. In such a case, the valve core would have four slots 18a, one pin means would pass through the extra two slots 18a and the eyelet 20b of the central guide rod and the other would as illustrated in FIGS. 2 through 5 provide the vertical stops for the slidable valve core.

After reading the foregoing detailed description, it should be apparent that the objects set forth at the outset of this specification have been successfully achieved. Accordingly,

What is claimed is:

1. A self-cleaning root feeder for supplying fluid material to sub-strata root systems, said root feeder comprising: an elongated hollow pipe having an inlet at the upper end thereof adapted for connection to a source of fluid; a central guide rod suspended axially in said pipe and extending beyond the lower end thereof, said guide rod terminating in a generally pointed end; a valve core means slidably disposed within said pipe and having a head adapted to abut against and extending beyond the lower end thereof, said valve core means axially embracing said central guide rod and being guided thereby by a sliding fit; and wherein the abutment of said valve core head with said pipe defines an outlet for radial fluid flow said outlet being closed when said head abuts against said lower end of said pipe and being open when in a non-abutting relationship, said sliding fit of said valve core means and said central guide rod defining an outlet for axial fluid flow.

2. A root feeder as defined in claim 1 wherein said valve core means is slotted internally of said pipe and wherein pin means extend crosswise through said pipe and into said slots of said valve core means, said pin means and said slots defining limiting means for limiting axial movement of said valve core means.

3. A root feeder as defined in claim 2, wherein said central guide rod is suspended in said pipe by pin means.

4. A root feeder as described in claim 1, wherein said pipe has a surface at the lower end which generally conforms to and mates with a complementary surface on said head of said axially slidable valve core, and wherein said axially slidable valve core means has a bore therethrough into which bore passes said central guide rod.

5. A root feeder as described in claim 4, wherein the central guide rod carried by said pipe is generally helical and wherein said pipe carries a spring means providing pressure tending to slide said valve core means out of said pipe and expose said complementary surface of said axially slidable valve core, to thereby open said outlet for radial fluid flow.

6. A root feeder comprising a pipe, inlet means at the upper end of said pipe for receiving fluid under pressure and valve and point means at the lower end of said pipe, said valve and point means including a central guide rod having a generally pointed end and a valve core slidable in said pipe, said valve core having an axial bore through which said central guide rod passes, pin means retaining said central guide rod against removal from said pipe, and pin means providing an extended position and retracted position retaining said valve core against removal from said pipe, radial fluid outlet means comprising an axial space between said valve core and said pipe which is closed when said valve core is retracted and which is open when said valve core is extended, and axial fluid outlet means comprising a radial space between said valve core and said central guide rod.

* * * * *